US012560681B2

(12) United States Patent
Blair et al.

(10) Patent No.: US 12,560,681 B2
(45) Date of Patent: Feb. 24, 2026

(54) RADAR HAVING MULTI-BAND CONCENTRIC RINGS OF ARRAY ELEMENTS

(71) Applicant: Raytheon Company, Waltham, MA (US)

(72) Inventors: Shane D. Blair, Salem, NH (US); Yueh-Chi Chang, Salem, NH (US); Wayne Kim, Jr., Virginia Beach, VA (US); Wei Yu, Natick, MA (US); Patrick J. Makridakis, Mendon, MA (US)

(73) Assignee: Raytheon Company, Arlington, VA (US)

( * ) Notice: Subject to any disclaimer, the term of this patent is extended or adjusted under 35 U.S.C. 154(b) by 415 days.

(21) Appl. No.: 18/164,671

(22) Filed: Feb. 6, 2023

(65) Prior Publication Data

US 2024/0264269 A1 Aug. 8, 2024

(51) Int. Cl.
*G01S 7/03* (2006.01)
*G01S 13/02* (2006.01)
*H01Q 21/30* (2006.01)

(52) U.S. Cl.
CPC ............ *G01S 7/03* (2013.01); *G01S 13/0218* (2013.01); *H01Q 21/30* (2013.01); *G01S 2013/0227* (2013.01)

(58) Field of Classification Search
CPC .................. G01S 7/03; G01S 13/0218; G01S 2013/0227; G01S 2013/0245; H01Q 21/30; H01Q 3/26; H01Q 5/42
See application file for complete search history.

(56) References Cited

U.S. PATENT DOCUMENTS

| | | | | |
|---|---|---|---|---|
| 6,404,404 B1 * | 6/2002 | Chen | ...................... | H01Q 23/00 |
| | | | | 381/92 |
| 6,987,493 B2 | 1/2006 | Chen | | |
| 7,353,056 B2 | 4/2008 | Hazard et al. | | |
| 9,244,155 B2 * | 1/2016 | Bielas | ...................... | G01S 7/006 |
| 9,423,496 B2 | 8/2016 | Chang et al. | | |
| 10,714,840 B1 * | 7/2020 | West | ...................... | H01Q 21/30 |
| 11,211,702 B1 * | 12/2021 | Mahanfar | ............... | H01Q 5/42 |
| 11,264,729 B2 * | 3/2022 | Hand | ...................... | H01Q 19/18 |
| 11,289,806 B1 | 3/2022 | Wyse et al. | | |
| 11,575,204 B1 * | 2/2023 | Veysoglu | ................. | H01Q 3/34 |

(Continued)

FOREIGN PATENT DOCUMENTS

CN        114256639 A   *   3/2022   ............. H01Q 21/30

OTHER PUBLICATIONS

CN_114256639_A_I_translate.pdf (Year: 2022).*

(Continued)

*Primary Examiner* — Vladimir Magloire
*Assistant Examiner* — Yonghong Li

(57) ABSTRACT

Methods and apparatus for a radar system having an array including a series of concentric rings of array elements, wherein the concentric rings that have a shape defined by respective ellipses that increase in size from a center that is common to the respective ellipses. The series of concentric rings can include multiple groups of the concentric rings, wherein the concentric rings in each successive group are larger in size than the concentric rings in the first group.

20 Claims, 6 Drawing Sheets

(56)                    References Cited

U.S. PATENT DOCUMENTS

2018/0145424 A1*    5/2018   Puente Baliarda  ..  H01Q 21/062

OTHER PUBLICATIONS

Juarez et al., "Design of Concentric Ring Antenna Arrays Based on
Subarrays to Simplify the Feeding System;" Article from *Symmetry*,
vol. 12; Published Jun. 8, 2020; 16 Pages.
International Search Report and Written Opinion of the Interna-
tional Searching Authority dated Mar. 1, 2024 in connection with
International Patent Application No. PCT/US2023/081284, 13 pages.

* cited by examiner

DETERMINE ASPECT RATIO
300

CONFIGURE FIRST RING GROUP
302

CONFIGURE SECOND RING GROUP
304

CONFIGURE FIRST RING GROUP TO HAVE
AT LEAST SOME MULTI-BAND ELEMENTS
306

CONFIGURE RINGS TO RANDOMIZE
SIDELOBES
308

400

Processor
402

Volatile Memory
404

Output Device
407

Non-Volatile Memory
406

Computer Instructions
412

Operating System
416

Data
418

GUI
408

420

RADAR HAVING MULTI-BAND CONCENTRIC RINGS OF ARRAY ELEMENTS

As is known in the art, radar systems transmit a signal that may be reflected by a target to create signal return that can be processed by a receiver. Some radar systems are line of sight so that signals travel directly from the transmitter to a target and back to a receiver. Some radar systems are over-the-horizon (OTH) capable of detecting targets that are not directly in the line of sight of transmitted signals. One type of OTH radar refract signals off the ionosphere, which may be referred to a skywave OTH radar. Signals transmitted at an angle into the sky are refracted by the ionosphere towards the ground beyond the horizon. A target may be illuminated by the refracted signal and generate signal return that is refracted off the ionosphere again and detected by a receiver.

Conventional OTH radars use linear transmit arrays that do not have elevation scan, or large elevated arrays with limited elevation scan, resulting in wasted energy and many modes being returned from the target making target detection and tracking difficult.

SUMMARY

Example embodiments of the disclosure provide methods and apparatus for a radar having a concentric multi-band array for enabling elevation scan capability and creating a narrower elevation beam, in addition to the typical scan in azimuth direction. With this arrangement, a radar can include a scalable array layout that provides optimized RF performance for multi-band systems with minimal real estate. In some embodiments, a radar array has elliptical concentric rings to enhance scan performance for those systems requiring different fields of view in azimuth and elevation directions. The array layout may be scalable as element separations can be easily adjusted to balance array gain vs sidelobe performance. Wider separations will increase array gain but cause higher sidelobe. Distance between elements in each ring as well as separation between rings can be adjusted to somewhat randomize sidelobes to avoid grating lobes. Ring separations are typically increased gradually outward to create "thinning" effect of the array, which is well understood to have the benefits of higher gain with minimal sidelobe degradation. In some embodiments, starting clocking (phi) angle of each ring can also be adjusted to further randomize sidelobes. For multi-band layout, higher band elements are located in inner rings of the array and lower band elements are located in outer rings. In embodiments, some dual-band or multi-band elements in some inner rings may be used to enhance lower bands performance. It is understood that any practical number of bands can be used with any practical number and configuration of rings to meet the needs of a particular application.

In one aspect, a radar system comprises: a radar array including a series of concentric rings of array elements, wherein the concentric rings have a shape defined by respective ellipses, wherein the concentric rings increase in size from a center that is common to the respective ellipses, the series of concentric rings including: a first group of the concentric rings; a second group of the concentric rings, wherein the concentric rings in the second group are larger in size than the concentric rings in the first group.

A system may further include one or more of the following features: rotationally symmetric radiator elements with omnidirectional radiation pattern, at least one of the array elements in the concentric rings comprises a multi-band array element, array elements and spacing in the first group of concentric rings are configured for a first frequency band, the array elements and spacing in the second group of concentric rings are configured for a second frequency band, wherein the first frequency band is higher than the second frequency band, the second group of concentric rings comprises outer rings and the first group of concentric rings comprises inner rings, locations of at least some of the array elements in at least one of the first and second groups of concentric rings are configured to randomize sidelobes and minimize mutual coupling, an aspect ratio of the first and second groups of concentric rings is configured based on a selected field of view (FOV), a third group of the concentric rings, wherein the concentric rings in the third group are larger in size than the concentric rings in the second group, at least some of the elements in the radar array comprise tri-band elements, the radar system comprises an over the horizon radar, respective eccentricities of at least some of the concentric rings of array elements vary to lower grating lobes, and/or the first and second frequency bands could have a bandwidth ratio of 2:1 to 3:1.

In another aspect, a method comprises: in a radar array, employing a series of concentric rings of array elements, wherein the concentric rings have a shape defined by respective ellipses, wherein the concentric rings increase in size from a center that is common to the respective ellipses, the series of concentric rings including: a first group of the concentric rings; a second group of the concentric rings, wherein the concentric rings in the second group are larger in size that the concentric rings in the first group.

A method may further include one or more of the following features: rotationally symmetric radiator elements with omnidirectional radiation pattern, at least one of the array elements in the concentric rings comprises a multi-band array element, array elements and spacing in the first group of concentric rings are configured for a first frequency band, the array elements and spacing in the second group of concentric rings are configured for a second frequency band, wherein the first frequency band is higher than the second frequency band, the second group of concentric rings comprises outer rings and the first group of concentric rings comprises inner rings, locations of at least some of the array elements in at least one of the first and second groups of concentric rings are configured to randomize sidelobes and minimize mutual coupling, an aspect ratio of the first and second groups of concentric rings is configured based on a selected field of view (FOV), a third group of the concentric rings, wherein the concentric rings in the third group are larger in size that the concentric rings in the second group, at least some of the elements in the radar array comprise tri-band elements, the radar system comprises an over the horizon radar, respective eccentricities of at least some of the concentric rings of array elements vary to lower grating lobes, and/or the first and second frequency bands have a ratio of about 2:1 situated over ground screen of radius larger than maximum ring radius to enable proper takeoff angle.

BRIEF DESCRIPTION OF THE DRAWINGS

The foregoing features of this invention, as well as the invention itself, may be fully understood from the following description of the drawings in which.

DETAILED DESCRIPTION

Figure 1:
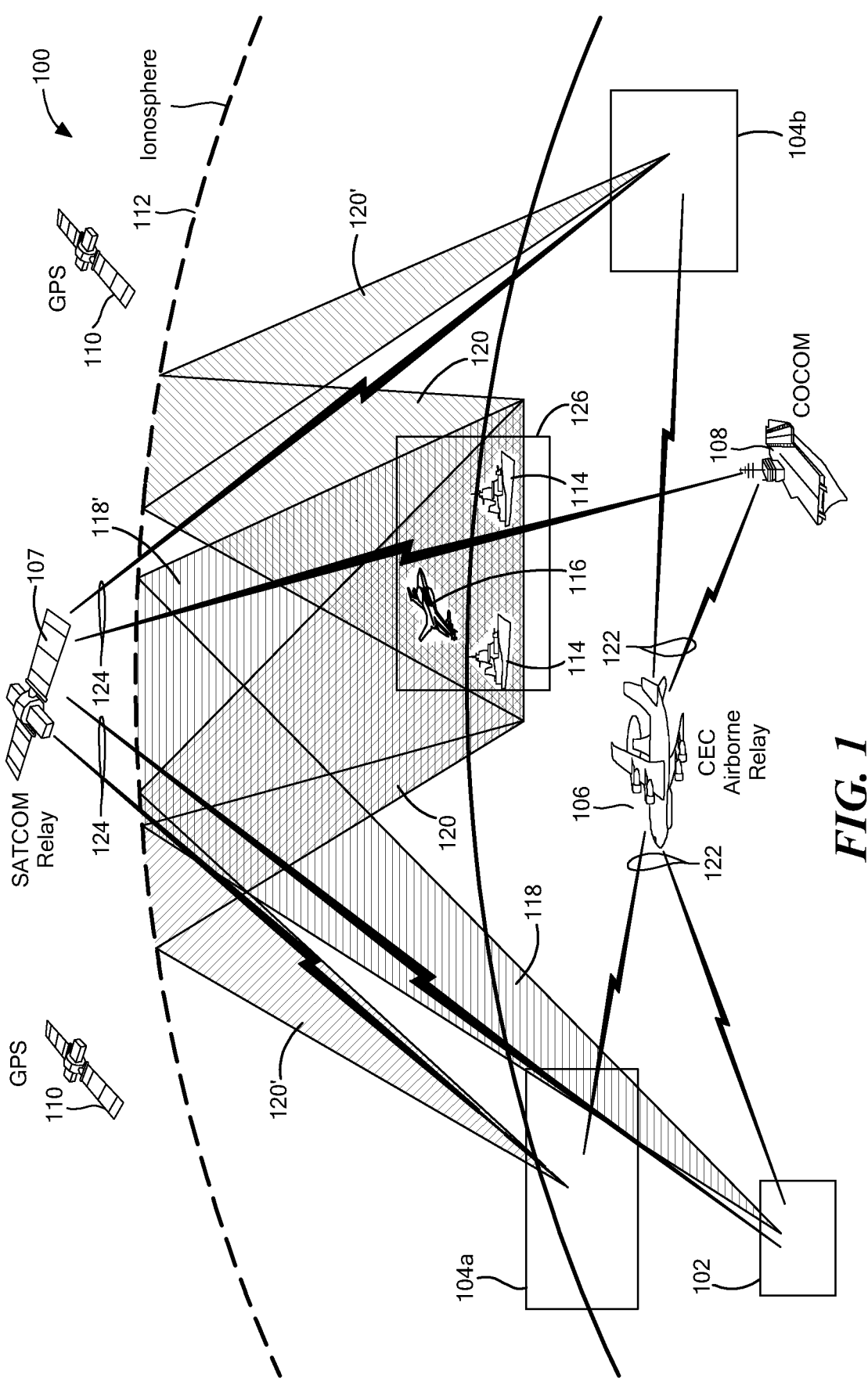
FIG. 1 is a conceptual diagram of an example OTH radar system having multiple bands of concentric rings of array elements in accordance with example embodiments of the disclosure.

FIG. 1 shows an exemplary embodiment of an over-the-horizon (OTH) radar system 100 having multi-band concentric ring arrays in accordance with example embodiments of the disclosure. In the illustrated embodiment, a transmitter 102 and one or more receivers 104a,b are provided. While multiple receivers 104a,b are shown, it will be appreciated that the concepts and techniques described herein are applicable to any practical number of receivers. The example OTH radar system 100 further includes an optional airborne relay 106, an optional satellite communications (SATCOM) relay 107, and an optional combatant command platform (COCOM) 108. In a particular embodiment, the various components 102, 104, 108 and/or airborne relay 106 include a GPS receiver to receive GPS signals (containing geo-position and time information) from a plurality of GPS satellites 110.

The transmitter 102 includes a radar transmitter coupled to a transmit antenna array and the receiver 104 includes a radar receiver coupled to a receive antenna array. It will be appreciated, after reading the present disclosure, that both the transmit antenna array and the receive antenna array are capable of steering their beams to the desired directions.

The transmitter 102, the receiver 104, and the COCOM 108 may be in communication with the airborne relay 106 using suitable wireless communication links 122. The communication links 122 can include, but are not limited to, RF links, microwave links, and/or optical links. In addition, one or more of the system components 102, 104, 108 may be in communication with the SATCOM relay 107 using any suitable unidirectional or bidirectional satellite communication links 124.

In operation, the transmitter 102 generates and transmits radar signals 118 which are directed up towards the ionosphere 112 and refracted back towards the ground as signals 118', using a process known as ionospheric refraction. The refracted signals 118' are generally directed downwards towards the ground to illuminate a selected target area 126. The signals 118' reflect off various objects within the target area to produce backscatter signals 120; such objects can include, for example, ships, aircraft, missiles, and land-based vehicles. The backscatter signals 120 are reflected back up to the ionosphere 112 and then down to one or more of the receivers 104 (the received signals are generally designated as signal 120' in FIG. 1). Next, the receivers process the received signals 120' to detect targets, such as ships 114 and/or aircraft 116, within the illuminated target area. Because the targets are detected indirectly via the ionosphere, direct line of sight between the transmit/receive ships and the targets is not needed.

The transmitted radar signals 118 may be high-frequency (HF) radio waves, sometimes referred to as "shortwave." It will be appreciated that the transmitted radar signals 118 must have sufficiently high power to overcome interference, both active and passive, such that the received signal 120' has a sufficiently high signal-to-noise ratio (S/N) for target detection.

As is known in the art, ionospheric refraction is a bending, through a complex process involving refraction, of electromagnetic waves/signals propagating in the ionosphere back toward the ground. The amount of ionospheric bending depends on the extent to which the radar signal penetrates the ionosphere (which is a function of the signal frequency), the angle of incidence, the polarization of the wave/signal, and ionospheric conditions, such as the ionization density. OTH systems may use vertical incident sounding ("overhead" sounding) or oblique sounding ("downrange" sounding) techniques to measure layer height and associated frequencies. These measurements that are used to determine suitable radar signal characteristics—such as direction, frequency, polarization—are based on the current ionospheric conditions. Additional signal characteristics—such as bandwidth, modulation type, pulse width, and pulse repetition frequency—may be selected based upon the type of target to be detected (e.g., ship, aircraft, or missile).

To illuminate a target area, the transmitter and receivers are dynamically reconfigured/recalibrated, in a coordinated manner, such that a suitable signal path can be established from the transmitter 102 to the target area (via the Ionosphere), and from the target area to the receivers 104a,b (also via the Ionosphere). Because environmental conditions can continually change, an adaptive process is employed to select suitable transmit signal characteristics, in real-time or near real-time, based upon current transmitter and receiver positions. Other factors may also be considered, including maximum useable frequency derived from the sounding data and the presence of a clear channel (i.e., a channel free of other external interference sources), which can be derived from a continuously running passive spectrum monitor receiver.

Although the exemplary system 100 is shown using a stationary transmitter 102 and receiver 104 configuration, in some embodiments, mobile transmitter(s) and mobile receiver(s) can be used. U.S. Pat. No. 9,423,495, which is incorporated herein by reference, shows an example shipboard transmitter and receiver configuration.

Figure 2:
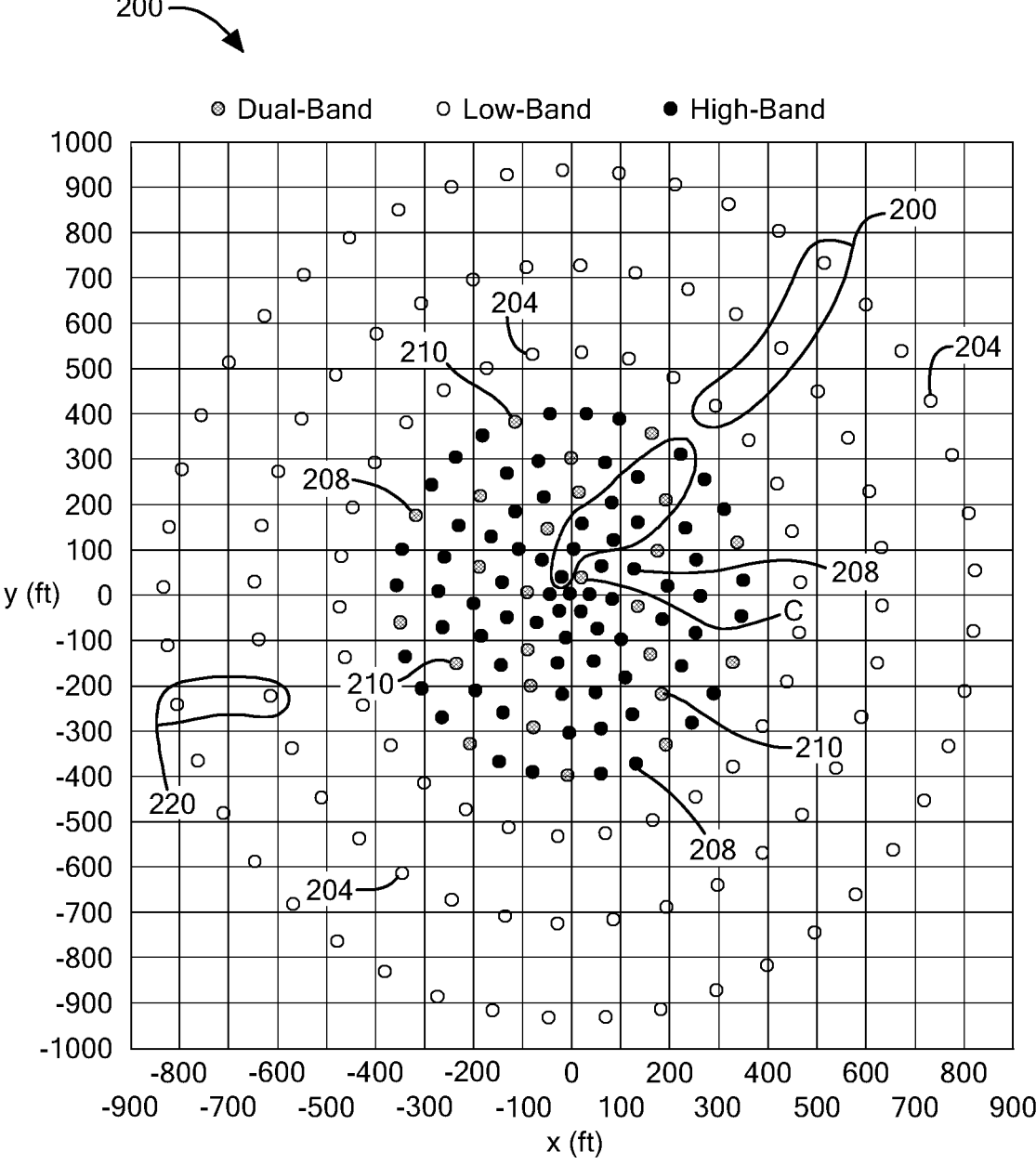
FIG. 2 is an element layout of a dual-band array having outer elliptical rings of low band elements and inner elliptical rings of high band and dual-band elements in accordance with example embodiments of the disclosure.

FIG. 2 shows an example dual-band array 200 having elliptical rings that increase in size as distance from the center increases. In the illustrated embodiment, a group 202 of outer rings comprise low band array elements 204 and a group 206 of inner rings comprise high band array elements 208 and some dual-band array elements 210 interspersed in the inner rings. In the illustrated embodiment, the outer ring group 202 and the inner ring group 206 are concentric ellipses. In other words, the rings have the same center, right in the middle of the array as indicated by the location of the center element C. Since typically 2D OTH arrays have different scan field of views in azimuth and elevation directions, the eccentricity of the ellipses can be chosen to optimize array gain while minimizing sidelobe RMS and mutual coupling. For the example shown, the eccentricity of all the ellipses is 0.47, i.e., same for all the rings. However, for some applications where further randomization is desired for lower grating lobes, eccentricities of some of the rings can be different, especially for outer rings.

For the dual-band example shown in FIG. 2, there is a bandwidth ratio of approximately 1:2 between low and high bands, so that one out of every four high-band elements are chosen to be dual-band element, in an example embodiment. This ensures that both bands occupy the entire aperture area without leaving the array aperture "holes" for optimal RF performance. Note that the locations of the dual-band elements are randomized for lower sidelobes.

In the illustrated embodiment, the elliptical outer and inner rings 202, 206 are sized for an OTH radar, as shown in feet in the x and y axes. The example array has 100 elements that are high band and 136 elements that are low band. The inner 100 elements include 75 high-band only elements and 25 dual-band elements. The outer 111 elements are low band only.

Figure 2A:
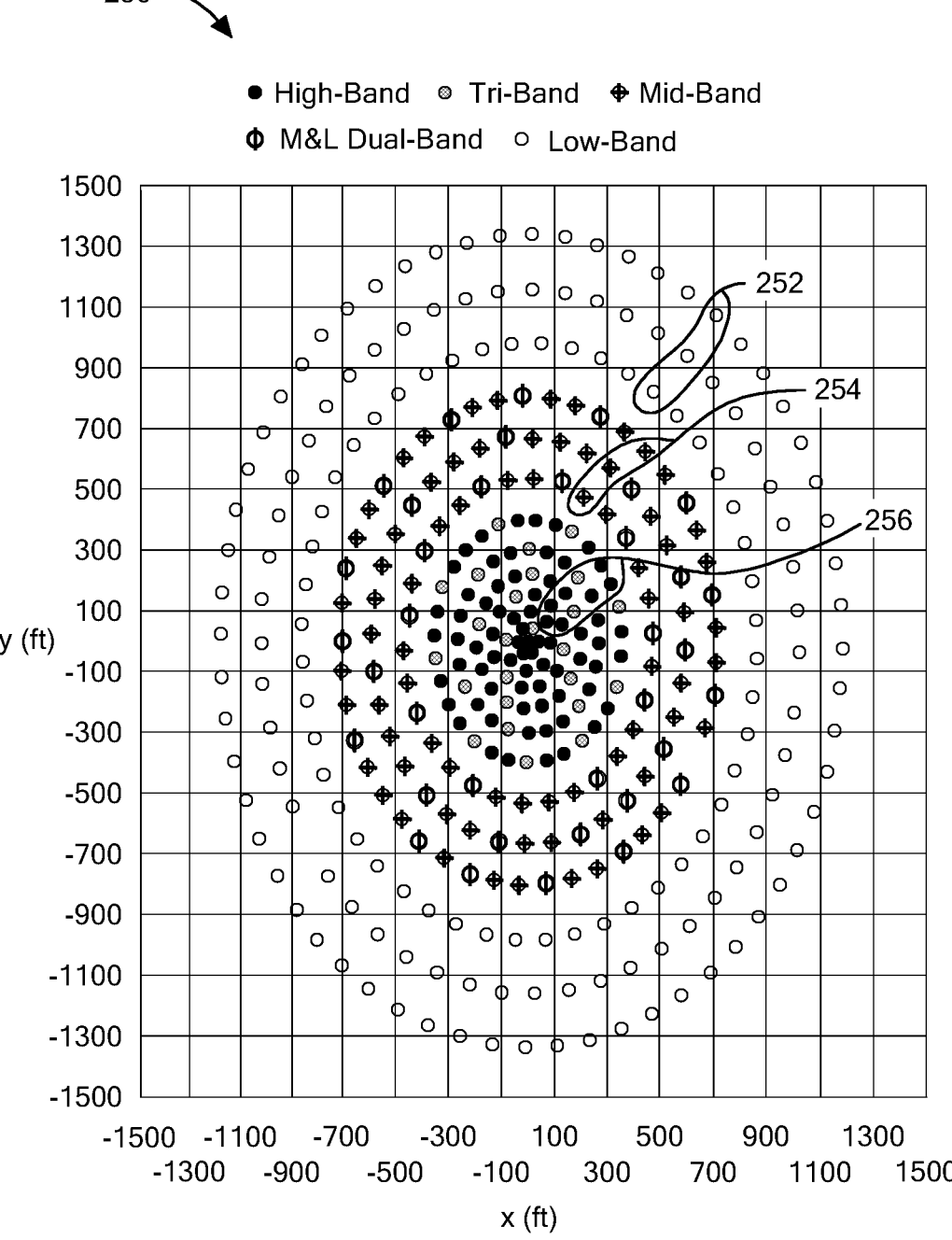
FIG. 2A is an element layout of a tri-band array having elliptical in accordance with example embodiments of the disclosure.

FIG. 2A shows a tri-band array 250 having an outer ring group 252 of low band elements, a second ring group 254 of mid band elements and some dual band (mid and low) elements, and an inner ring group 256 of high band elements and some tri band (low, mid, high) elements.

The major axis of the ellipses (y-axis in example) can correspond to the direction of the smaller scan, while the minor axis can be that of the wider scan. This is consistent with the array theory that for wider scan, the element spacing needs to be smaller. Separate transmit and receive arrays can have the same configuration although tradeoff is typically needed for other considerations.

Figure 2B:
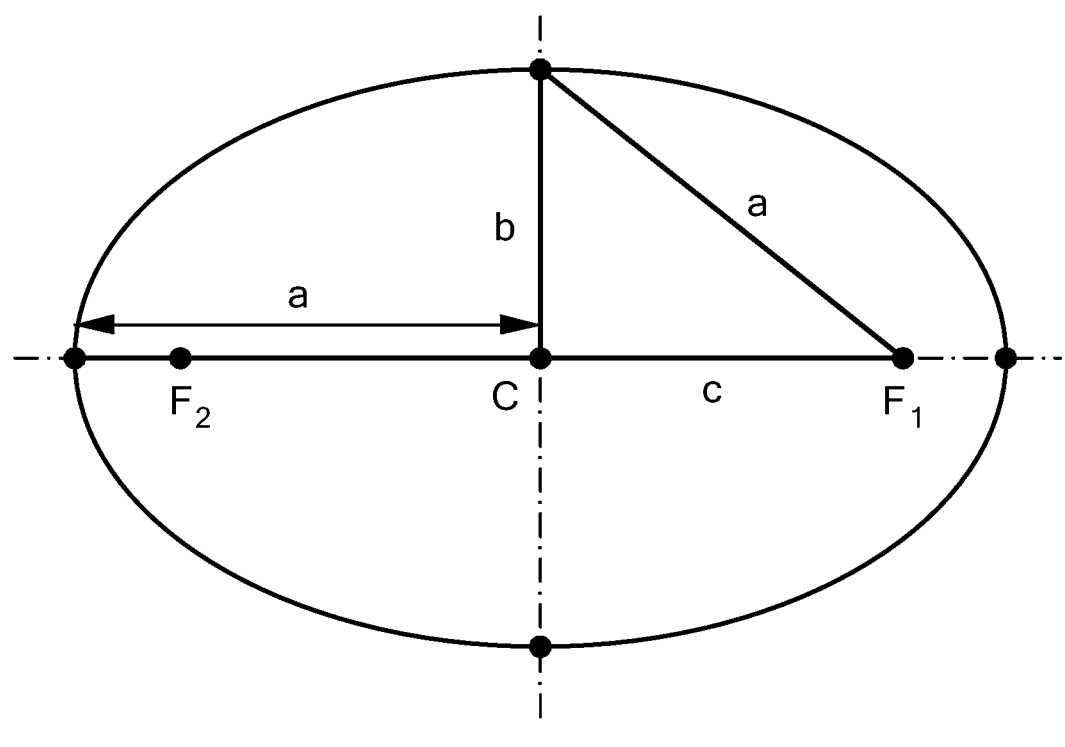
FIG. 2B is a graphical representation of an ellipse.

It is understood that as used herein, the term "ellipse" or "elliptical" refers to a shape defined by a plane curve that surrounds two focal points, where the sum of two distances to the focal points, for all points on the curve, is a constant. FIG. 2B shows an example ellipse with parameters including semi-major axis a, semi-minor axis b, and linear eccentricity c.

It is further understood that a circle is a special case of ellipse in which the focal points overlap. The elongation of an ellipse is defined by its eccentricity. A standard ellipse centered at the origin with width 2a and height 2b can be defined as:

$$\frac{x^2}{a^2} + \frac{y^2}{b^2} = 1$$

The ellipse eccentricity e is defined as follows:

$$e = \sqrt{1 - \left(\frac{b}{a}\right)^2}$$

Linear eccentricity c, which is the distance from the center C to a foci is defined as $$c = \sqrt{a^2 + b^2}$$

For applications where desired scan angles are similar between azimuth and elevation, the concentric rings would become circular, which is a special case of elliptical with eccentricity=0.

The multi-band concentric ring array configuration offers good control of element separations to maximize array gain while minimizing sidelobes. The array layout is defined by a few variables, starting with the major and minor radii of the first ellipse (a and b), plus radius ratio, number of elements, and starting element clocking position for each added ring. In embodiments, the eccentricity for the elliptical rings can be adjusted based on the desired field of view (FOV) and its associated scan angles to optimize scan performance. The array layout is fully scalable by simply changing the initial ellipse radii (a and b) and keeping all other variables to be the same, or modifying some if needed. In addition, the concentric rings save significant real estate compared to multiple separate arrays.

It is understood any practical number of additional frequency band ellipses can be added to meet the needs of a particular application.

Figure 3:
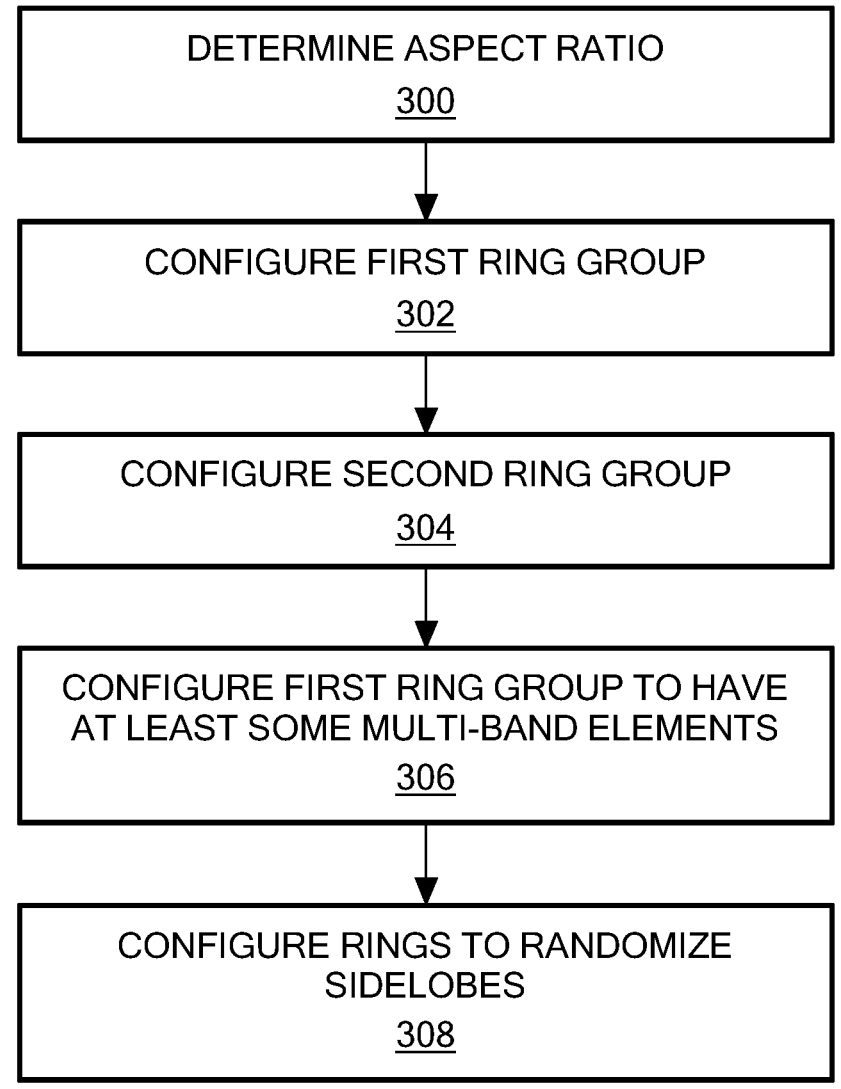
FIG. 3 is a flow diagram example steps for generating a scalable array layout including outer elliptical rings of low band elements and inner elliptical rings of high and dual-band elements in accordance with example embodiments of the disclosure.

FIG. 3 shows an illustrative sequence for generating example array layout having a first ring group, e.g., inner rings, with high band array elements, and a second ring group, e.g., outer rings, with low band array elements in accordance with example embodiments of the disclosure. The first step 300 is to determine aspect ratio of the ellipse based on the required FOV. In step 302, a first ring group is configured. In an example embodiment, the first group of rings comprises elliptical inner rings having high band array elements. In step 304, a second ring group is configured. In an example embodiment the second ring group comprises elliptical outer rings having low band elements. In optional step 306, the first ring group is configured to have at least some multi-band elements. In step 308, some of the rings are configured to randomize sidelobes generated by the array by adjusting starting clocking angles of the rings. It is understood that starting clocking angle of a ring refers to rotating one ring with respect to at least one other ring. For example, as shown in FIG. 2, a subset 220 of elements are offset respect to the x axis. With this arrangement, array elements may have some offset, which may be random, to reduce sidelobes as well as mutual coupling.

Figure 4:
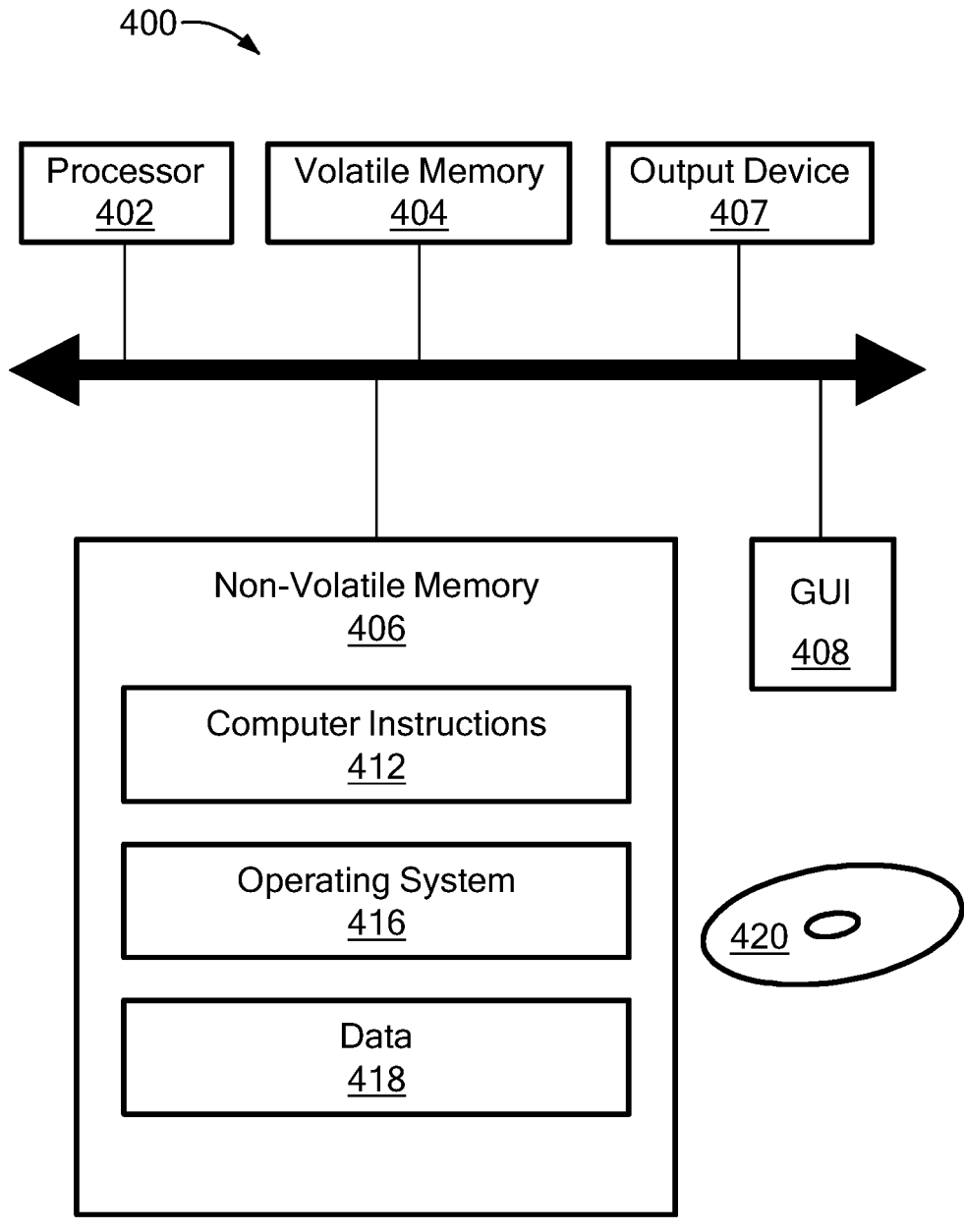
FIG. 4 is a schematic representation of an example computer that can perform at least a portion of the processing described herein.

FIG. 4 shows an exemplary computer 400 that can perform at least part of the processing described herein. For example, the computer 400 can perform processing to generate signals to configure circuit elements in the first, second, and/or third layers. The computer 400 includes a processor 402, a volatile memory 404, a non-volatile memory 406 (e.g., hard disk), an output device 407 and a graphical user interface (GUI) 408 (e.g., a mouse, a keyboard, a display, for example). The non-volatile memory 406 stores computer instructions 412, an operating system 416 and data 418. In one example, the computer instructions 412 are executed by the processor 402 out of volatile memory 404. In one embodiment, an article 420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or objectoriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A radar system, comprising:
a radar array including a series of concentric rings of array elements, wherein the concentric rings have a shape defined by respective ellipses, wherein the concentric rings increase in size from a center that is common to the respective ellipses, the series of concentric rings including:
a first group of the concentric rings, wherein a subset of the array elements comprising one out of every four array elements in the first group is configured for multi-band; and
a second group of the concentric rings, wherein the concentric rings in the second group are larger in size than the concentric rings in the first group.

2. The system according to claim 1, wherein the subset of the array elements in the first group of concentric rings comprises dual-band array elements.

3. The system according to claim 1, wherein a majority of the array elements in the first group of concentric rings are configured for a first frequency band.

4. The system according to claim 3, wherein the array elements in the second group of concentric rings are configured for a second frequency band, wherein the first frequency band is higher than the second frequency band.

5. The system according to claim 4, wherein the first and second frequency bands have a bandwidth ratio of between 2:1 and 3:1.

6. The system according to claim 1, wherein the second group of concentric rings comprises outer rings and the first group of concentric rings comprises inner rings.

7. The system according to claim 1, wherein locations of at least some of the array elements in at least one of the first and second groups of concentric rings are configured to randomize sidelobes.

8. The system according to claim 1, wherein an aspect ratio of the first and second groups of concentric rings is configured based on a selected field of view (FOV).

9. The system according to claim 1, further including a third group of the concentric rings, wherein the concentric rings in the third group are larger in size than the concentric rings in the second group.

10. The system according to claim 9, wherein at least some of the array elements in the radar array comprise tri-band elements.

11. The system according to claim 1, wherein the radar system comprises an over-the-horizon radar.

12. The system according to claim 1, wherein respective eccentricities of some of the concentric rings of array elements vary to lower grating lobes.

13. A method, comprising:
in a radar array, employing a series of concentric rings of array elements, wherein the concentric rings have a shape defined by respective ellipses, wherein the concentric rings increase in size from a center that is common to the respective ellipses, the series of concentric rings including:
a first group of the concentric rings, wherein a subset of the array elements comprising one out of every four array elements in the first group is configured for multi-band; and
a second group of the concentric rings, wherein the concentric rings in the second group are larger in size than the concentric rings in the first group.

14. The method according to claim 13, wherein the subset of the array elements in the first group of concentric rings comprises a dual-band array elements.

15. The method according to claim 13, wherein a majority of the array elements in the first group of concentric rings is configured for a first frequency band.

16. The method according to claim 15, wherein the array elements in the second group of concentric rings are configured for a second frequency band, wherein the first frequency band is higher than the second frequency band.

17. The method according to claim 13, wherein the second group of concentric rings comprises outer rings and the first group of concentric rings comprises inner rings.

18. The method according to claim 13, wherein locations of at least some of the array elements in at least one of the first and second groups of concentric rings are configured to randomize sidelobes.

19. The method according to claim 13, wherein an aspect ratio of the first and second groups of concentric rings is configured based on a selected field of view (FOV).

20. The method according to claim 13, further including employing a third group of the concentric rings, wherein the concentric rings in the third group are larger in size than the concentric rings in the second group, wherein at least some of the array elements in the radar array comprise tri-band elements.

* * * * *